United States Patent [19]
Lau, Jr. et al.

[11] 3,800,469
[45] Apr. 2, 1974

[54] FLOWER POT

[75] Inventors: John F. Lau, Jr.; Gordon E. Swedberg, both of Minneapolis, Minn.

[73] Assignee: T. O. Plastics, Inc., Minneapolis, Minn.

[22] Filed: July 17, 1972

[21] Appl. No.: 272,452

[52] U.S. Cl. .................................................. 47/34
[51] Int. Cl. .............................................. A01g 9/02
[58] Field of Search ............ 206/46 PL; 220/DIG. 6; 47/34, 34.13, 38, 1.2

[56] References Cited
UNITED STATES PATENTS
3,315,410  4/1967  French ........................................ 47/34
2,814,427  11/1957  Emery ................................. 47/34 UX
3,027,684  4/1962  Keiding ................................... 47/34

FOREIGN PATENTS OR APPLICATIONS
930,534  7/1963  Great Britain ..................... 47/34.13
1,561,341  2/1969  France .................................... 47/34

Primary Examiner—Robert E. Bagwill
Attorney, Agent, or Firm—Robert M. Dunning

[57] ABSTRACT

Plastic flower pots are provided with drainage and aerating apertures at the juncture between the pot bottom and the tapered side wall. The side edges and top edge of these apertures are protected by an inverted U-shaped structure of tunnel-like form.

2 Claims, 5 Drawing Figures

PATENTED APR 2 1974 3,800,469

FLOWER POT

This invention relates to an improvement in flower pots and deals particularly with a flower pot which can be readily molded of plastic.

BACKGROUND OF THE INVENTION

In the past it has been common practice to form flower pots of clay or similar material. Pots of this type are usually round in cross-section and have tapered walls, and are usually provided with a generally vertical cylindrical flange at their upper end so that they may be nested together. Clay pots of this type normally include a central opening at the center of the bottom to permit the drainage of excess water and to permitting aerating and watering from the bottom of the pots if it is so desired. During recent years it has been found practical, and economically feasible, to make flower pots out of molded plastic. Plastic flower pots do not break easily, and the labor cost involved in producing them is usually less than that involved in producing clay pots.

One of the problems which has existed in flower pots having openings only in their lower end, lies in the fact that holes of this type may become clogged up when placed on a flat surface. It has been found that flower pots having openings in their side walls are in many ways advantageous over the conventional form of flower pot having a central opening in the pot bottom. Plastic pots have been produced having holes in the side walls. Difficulty has been experienced in maintaining the tools or dies used in the formation of the pots. Due to the slight taper of the side walls, and due to the fact that the female portions of the mold must contact the male portions thereof in order to form the side wall openings, excessive wear has been experienced. As a result, the molds have been made with replaceable parts so that the parts subjected to wear could be more readily replaced. However, adjustment and replacement was required quite regularly and at frequent intervals.

The use of flower pots having holes in the side also has certain inherent difficulties. There is a definite tendency for the roots of the plant to grow through the holes in the sides of the pot and often times to grow into the surface of the soil on the growing bench. Accordingly, when the pot is removed when the plant has reached the proper age, the projecting roots have to be broken off or cut off in order to provide a presentable appearance. This action not only resulted in a setback in the growing of the plants, but also was time consuming and hard on the hands of the operator.

SUMMARY OF THE INVENTION

Many of the difficulties experienced in the molding of flower pots having side openings may be eliminated by forming these openings at the juncture between the bottom wall and the side wall. Not only are the openings at the desired level, but also this arrangement permits the molds to be readily made. Furthermore, by providing an inverted generally U-shaped wall encircling the opening, the contacting areas of the male and female portions of the die may be materially reduced. The wall thus formed produces a tunnel-like opening having a top wall and side walls communicating with the pot bottom. The horizontal ledge forming the top of each such structure and the upright ledges providing the sides of the tunnel, produce a structure in which the roots of the plant are directed downwardly and inwardly toward the center of the pot. As a result, the tendency for the roots to grow through the openings is greatly reduced.

The formation of the flower pots of molded plastic makes possible the use of square pots as well as those which are circular in cross-section. This is of advantage to the grower, as the flower pots may fit more readily in a bench or flat. In other words, the edges of the pot may abut one another with a minimum of waste space between the pots.

In the formation of the new flower pots, the side wall of the pot may be at an angle of 2-½° to 3° to the vertical. The apertures which are at the juncture of the bottom wall and side walls terminate at an angle of approximately 20° to the vertical. Where holes are formed in the side walls, the steep angle of contact between the shut out on the female mold and the male mold wears out rapidly, resulting in flashing over the hole and causing frequent delays in the molding apparatus and adjustment of the tool. In the present design, where the metal to metal contact is along surfaces about 20 degrees to the vertical, these surfaces are relieved of drag movements, resulting in longer wear and much less adjustment.

The design described is such that there is a hole through the pot bottom as well as the sides. This structure results in a reduced wash out of light solids. The tunnel-like framework around the openings greatly reduces the washing out of such soils as crushed spagnum moss with vermiculite. This is important to the growers because they can water vigorously without excessive wash out. A main feature of the invention lies in the fact that the construction affords a maximum of drainage, yet minimizes the vertical flushing of soil through an exposed hole. This is of importance because the use of light soil mixes has become increasingly popular with growers of ornamental plants. Regular loam or topsoil previously used did not flush out as readily as light soil mixes such as one third each of crushed peat moss, vermiculite and loam.

These and other objects and novel features of the present invention will be more clearly and fully set forth in the following specification and claims.

DESCRIPTION OF THE PREFERRED EMBODIMENT

Figure 1:
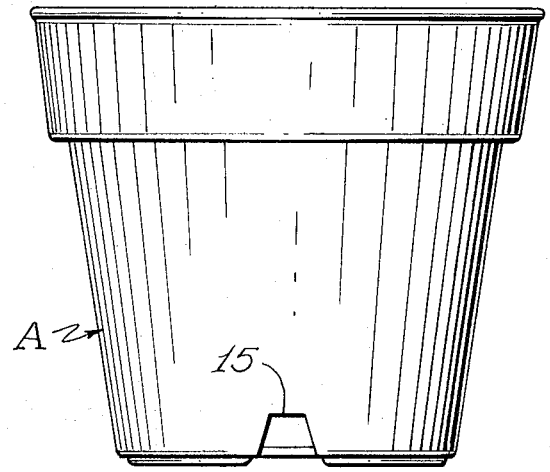
FIG. 1 is a side elevational view of a flower pot, showing the general construction thereof.

The flower pot is indicated in general by the letter A. As indicated in the drawings, it includes a bottom panel 10, and a frusto-conical wall 11 extending upwardly and outwardly therefrom. The wall 11 is preferably provided with an outwardly extending flange 12 at its upper extremity, and the flange 12 is provided at its outer extremity with a tapered rim portion 13. As a result, the outward appearance of the pot may be similar to that of conventional clay pots which are normally provided at their upper end with a stacking rim. The upper extremity 14 of the rim 13 may be increased in thickness to provide a beaded or rounded edge.

Figure 4:
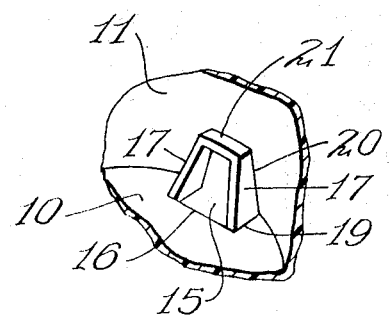
FIG. 4 is a perspective detail showing one of the wall openings.

The flower pot is provided with a series of angularly spaced apertures 15 which are formed in the manner perhaps best illustrated in FIG. 4 of the drawings. The edge of the bottom panel 10 is provided with a rectangular notch 16, and a pair of generally trapezoidal shaped side flanges 17 are connected at their lower and wide parallel edge 19 to the bottom wall 10 and along their outer edges along the juncture lines 20 to the pot side wall 11. The two side flanges 17 are of similar outline, and are connected at their upper edges by a generally horizontal connecting ledge or flange portion 21. In other words, each aperture 15 includes a tunnel-like enclosure extending into the pot at the juncture between the side wall 11 and the bottom wall 10. The side flanges 17 and top flange 21 have a tendency to direct the roots of the plants growing in the flower pot inwardly and downwardly toward the center of the pot. Thus little difficulty has been experienced in removing the plant from the pot, if such removal is desired, and the roots do not have as much tendency to grow through the side openings to require breaking off or trimming before the plant is sold. Furthermore, because of the fact that the openings 15 are encircled by the tunnel-like enclosure, the projecting roots may be much more easily broken off or trimmed as only one of the edges of each aperture is a free edge. In other words, the tunnel-like enclosure is attached to all but the base edge of the notch 16 which prevents the hands from contact with most of the surfaces which would normally be exposed in the side wall aperture of the flower pot.

It will be noted that the trapezoidal side flanges 17 slope upwardly and inwardly slightly to permit the withdrawal of the shut outs. This slope or draft is held at a minimum so that the tunnel-like members will not nest together. The inner ends of these tunnel-like members are on planes which are about 20° from the vertical, compared to a 2-1/2° to 3° taper of the wall 11. As a result, the metal to metal contact between the shut outs of the female mold and the surface of the male mold has little tendency to wedge together or frictionally engage to cause premature wearing of the shut-outs.

Figure 5:
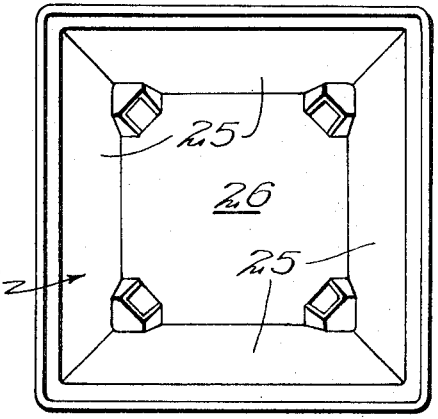
FIG. 5 is a view similar to FIG. 2 showing a square pot rather than one of circular cross-section.
Figure 2:
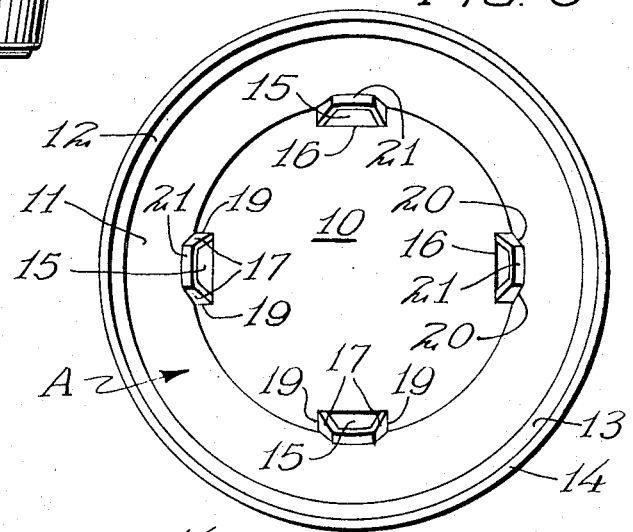
FIG. 2 is a top plan view of the same.
Figure 3:
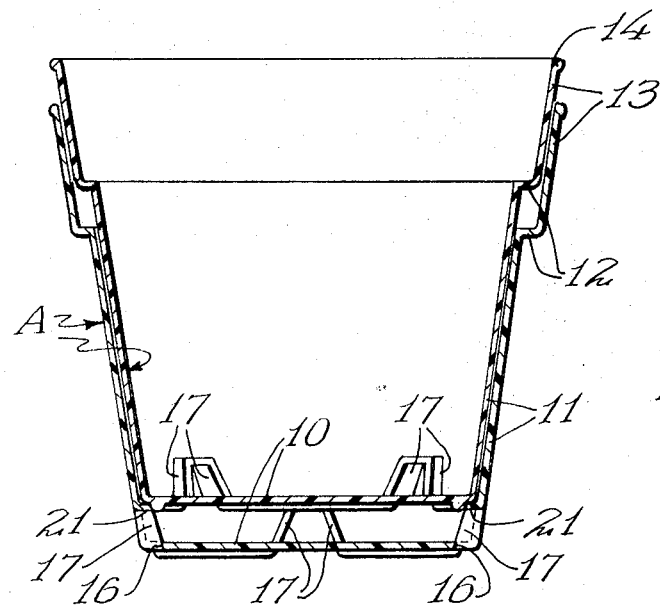
FIG. 3 is a vertical sectional view through a pair of similar pots in superimposed relation.

In FIG. 5 of the drawings I disclose a modified form of construction B. In view of the fact that this structure is identical with the other form of construction with the exception of the shape, similar identifying numerals have been used. The side wall openings are at the juncture of the four side walls 25 and the bottom wall 26 rather than at the juncture of the side walls 11 and bottom wall 10 as in the previously described construction. It will be noted from FIG. 3 of the drawings that the present construction also provides a means of stacking the pot so that they cannot wedge together. The upper flange 21 of the tunnel-like enclosures form a support for the bottom wall 10 of the similar pot as indicated in this figure, and one pot may rest upon the other without becoming wedged together.

In accordance with the Patent Statutes, I have described the principles of construction and operation of my FLOWER POT, and while I have endeavored to set forth the best embodiment thereof, I desire to have it understood that changes may be made within the scope of the following claims without departing from the spirit of my invention.

We claim:
1. A flower pot including:
a bottom wall,
upwardly and outwardly inclined side walls encircling said bottom wall, integral therewith and extending upwardly therefrom,
apertures through said walls at the juncture between, and extending into, said bottom wall and said side walls, and protective flanges extending from said side walls into said pot along opposite sides of each said aperture and upwardly from said bottom wall and a flange connecting the upper ends of said first named flanges and overlying each aperture.
2. The structure of Claim 1 and in which said flanges provide a generally inverted U-shaped structure extending into said pots.

* * * * *